US006917442B1

(12) United States Patent
Eguchi

(10) Patent No.: US 6,917,442 B1
(45) Date of Patent: Jul. 12, 2005

(54) ELECTRONIC PRINTBOARD APPARATUS AND ITS PRINTING METHOD

(75) Inventor: Kazuhiro Eguchi, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/450,236

(22) Filed: Nov. 29, 1999

(30) Foreign Application Priority Data

Nov. 27, 1998 (JP) .......................................... 10-337163

(51) Int. Cl.[7] .......................... G06F 15/00; G03G 15/00

(52) U.S. Cl. ......................... 358/1.6; 358/1.6; 358/296; 399/364

(58) Field of Search ............................... 358/1.15, 296, 358/1.6; 270/58.2, 58.9, 58.1, 58.14; 271/182; 399/364

(56) References Cited

U.S. PATENT DOCUMENTS

| | | | | | |
|---|---|---|---|---|---|
| 4,720,749 | A | * | 1/1988 | Satake | 358/452 |
| 4,727,431 | A | * | 2/1988 | Nakamura et al. | 358/401 |
| 4,901,100 | A | * | 2/1990 | DiBianca | 399/184 |
| 5,146,345 | A | * | 9/1992 | Yamashita et al. | 358/296 |
| 5,329,444 | A | * | 7/1994 | Takahashi et al. | 705/8 |
| 5,496,116 | A | * | 3/1996 | Senda | 400/61 |
| 5,692,225 | A | * | 11/1997 | Bernardi et al. | 396/318 |
| 6,067,902 | A | * | 5/2000 | Takahashi | 101/118 |
| 6,069,708 | A | * | 5/2000 | Eom | 358/1.7 |
| 6,462,831 | B1 | * | 10/2002 | Akiyama | 358/1.14 |

FOREIGN PATENT DOCUMENTS

| | | |
|---|---|---|
| JP | 10-151893 | 6/1998 |

* cited by examiner

*Primary Examiner*—Kimberly Williams
*Assistant Examiner*—Saeid Ebrahimi-Dehkordy
(74) *Attorney, Agent, or Firm*—RatnerPrestia

(57) ABSTRACT

In the case of using a plurality of printing means, even if a feeding speed of each printing means of the plurality of printing means is varied, a print of superior quality is always provided. The electronic print-board apparatus comprises a printing device for supplying a paper sheet P by a feeding roller to a printing section that is formed by a printing head and a platen roller and a control system. The control system pauses or reduces a speed of the feeding roller according to detection of a leading end of the paper sheet P by a paper detecting sensor so that the paper sheet P reaches the printing section coincidentally when an optical reading device starts scanning an image on a surface of a screen as it is revolved.

30 Claims, 6 Drawing Sheets

ELECTRONIC PRINTBOARD APPARATUS AND ITS PRINTING METHOD

BACKGROUND OF THE INVENTION

1. Field of the Invention

The present invention. relates to an electronic print-board apparatus capable of recording and issuing in paper such information as a meeting agenda and drawings that are written on a screen of the board, particularly, an electronic blackboard apparatus provided for the purpose of reducing time from the beginning to end of printing in the case that plain sheet paper is used as a printing medium. The print-board means a blackboard, whiteboard, chalkboard, or write-board etc.

2. The Related Art

An electronic print-board apparatus comprises a screen that is incorporated in a looped form in a board. Such information as letters and figures are recorded in the screen. The information recorded is printed and issued in recording paper when it is required. The printing operation comprises steps of revolving the screen for reading and storing the information on a surface of the screen by a CCD, for example, and printing it thereafter by means of a printing device.

In such electronic print-board apparatus, mainly from the viewpoint of costs of the apparatus itself and recording paper used, thermal paper is generally employed as a recording medium. Accordingly, in order to cope with the thermal paper, the printing device is often provided with a printing head of thermal head type that comes in contact with the surface of thermal paper as a standard specification.

The thermal paper is wound in a roll, and the roll is unwound and supplied to the printing head for printing when the printing device is actuated. Then, the paper is discharged, after printing, from a lower side of the board as a sheet of paper of a size containing a printing area.

However, in the case such thermal paper is employed as recording paper, the paper is relatively not sturdy in quality, and is easily curled due to its history of being wound in a roll, thus it is difficult to be clerically handled and filed. In addition, the thermal paper has a characteristic of being changed in color in the course of time. Therefore, information printed and issued in the thermal paper is often copied onto plain paper by a copying machine, resulting in waste of time and paper.

In the case of plain sheet paper is employed as recording paper in place of such thermal paper, there is no difficulty in filing and handling, and an image recorded by printing comes to be clearer. In an electronic print-board apparatus for use with such plain paper offers easier clerical handling and filing in comparison with one for use with thermal paper.

An important point in an electronic apparatus is to reduce time required for printing to issuing in recording paper letters and figures that are written in a screen as much as possible. In order to reduce the time, it is effective, for example, to revolve the screen for simultaneously initiate a reading operation of an image by an optical reduction system including a CCD and a printing operation by a printing device. In other words, by synchronizing initiation of reading of an image and initiation of printing in recording paper, the processing time can be remarkably reduced in comparison with such conventional method that a printing operation is initiated only after an entire printing area of the screen is scanned for reading.

In such constitution that operations of reading images on the screen and printing them are synchronized with each other, by timing such that the recording paper reaches a print starting position when the screen comes to an image reading position, displacement of images within the recording paper and non-printed parts are reduced, and images of a good quality can be printed in the recording paper.

In the case the thermal paper is provided in the form of a roll, the thermal paper is extended integrally in the form of a continuous band to the printing head. Thus, a feeding speed of the thermal paper to the printing head and a downstream side thereof can be maintained in a constant manner by properly controlling feeding rollers that are provided in a line. Therefore, a synchronous relation between initiations of the operations of reading images on the screen and printing them can be maintained in a relatively high level.

On the other hand, in the case plain sheet paper is employed as recording paper, the paper sheets are fed from a tray one after another. Thus, the recording paper is intermittently fed to the printing head. Therefore, time required for a leading end of the paper to reach the printing head may be varied by feeding conditions.

For example, in the case the tray containing the paper is provided with a pick-up roller for picking up the paper and a hopper for compressing the paper against the pick-up roller, a first one of paper sheets is nipped in a predetermined position between the pick-up roller and the hopper. Therefore, for the first sheet of recording paper, time to reach the printing head is maintained as it is predetermined.

However, a second sheet of paper fed in succession may enter a nip part between the pick-up roller and the hopper due to friction between the second sheet and the first sheet, and a distance to the printing head is, therefore, slightly reduced.

Accordingly, time for a leading end of the second sheet to reach the printing head is also reduced, and the print starting time is reached before the time of reading images on the screen. Thus, when there is a difference between the image reading time and the print starting time, images read may be printed in a displaced manner on the paper, or an edge portion of image may be non-printed.

As described, while the synchronous relation between the image reading and printing operations can be maintained in such apparatus that rolled paper as thermal paper is continuously fed in the form of a band, it is difficult to maintain the synchronous relation in an apparatus for use with sheet paper, and failures in printing tend to be caused as a result.

SUMMARY OF THE INVENTION

An electronic print-board apparatus according to the invention comprises reading means for reading, from a predetermined position, image information that is written in a writing medium having a writing surface, printing means for printing the image information read by the reading means onto a printing medium and control means for controlling driving of the reading means according to driving of the printing means.

The other electronic print-board apparatus according to the invention comprises the reading means, the printing means and control means for controlling driving of the printing means according to driving of the reading means.

The still other electronic print-board apparatus according to the invention comprises the reading means, the printing means and control means for controlling print starting time of the printing means in such manner that it is synchronized with reading starting time of the reading means.

A printing method for printing information written in a writing surface of an electronic print-board onto a plurality of plain paper sheets according to the invention comprises steps of:

(a) placing the plurality of printing.sheets in a paper tray, (b) moving at least one of reading means and the writing surface to an initial position so that the reading means and the writing surface are faced to each other;

(c) transporting a first printing sheet of the plurality of printing sheets from the paper tray to printing means;

(d) reading the written information by the reading means, and printing the written information to the first printing sheet by the printing means according to information from the reading means;

(e) transporting a second printing sheet of the plurality of printing sheets from the paper tray to the printing means after printing onto the first printing sheet, and controlling at least one selected from the group consisting of the reading means, the printing means and a feeding means in such manner that reading starting time of the reading means to initiate reading next written information and print starting time of the printing means to initiate printing onto the second printing sheet are matched to each other; and (f) reading the written information by the reading means, and printing the written information onto the second printing sheet by the printing means according to information from the reading means.

It is particularly preferable that the control means control driving of the printing means in such manner that it is synchronized with driving of the reading means.

The control means controls driving of the printing means by pausing it for synchronization with driving of the reading means.

The control means controls a driving speed of the printing means by reducing for synchronization with driving of the reading means.

In this invention, the printboard means a blackboard, whiteboard, chalkboard, or write-board etc.

By this construction in the case of using a plurality of printing means, even if a feeding speed of each printing means of the plurality of printing means is varied, a print of superior quality is always provided.

DESCRIPTION OF REFERENCE NUMBERALS

Figure 1:
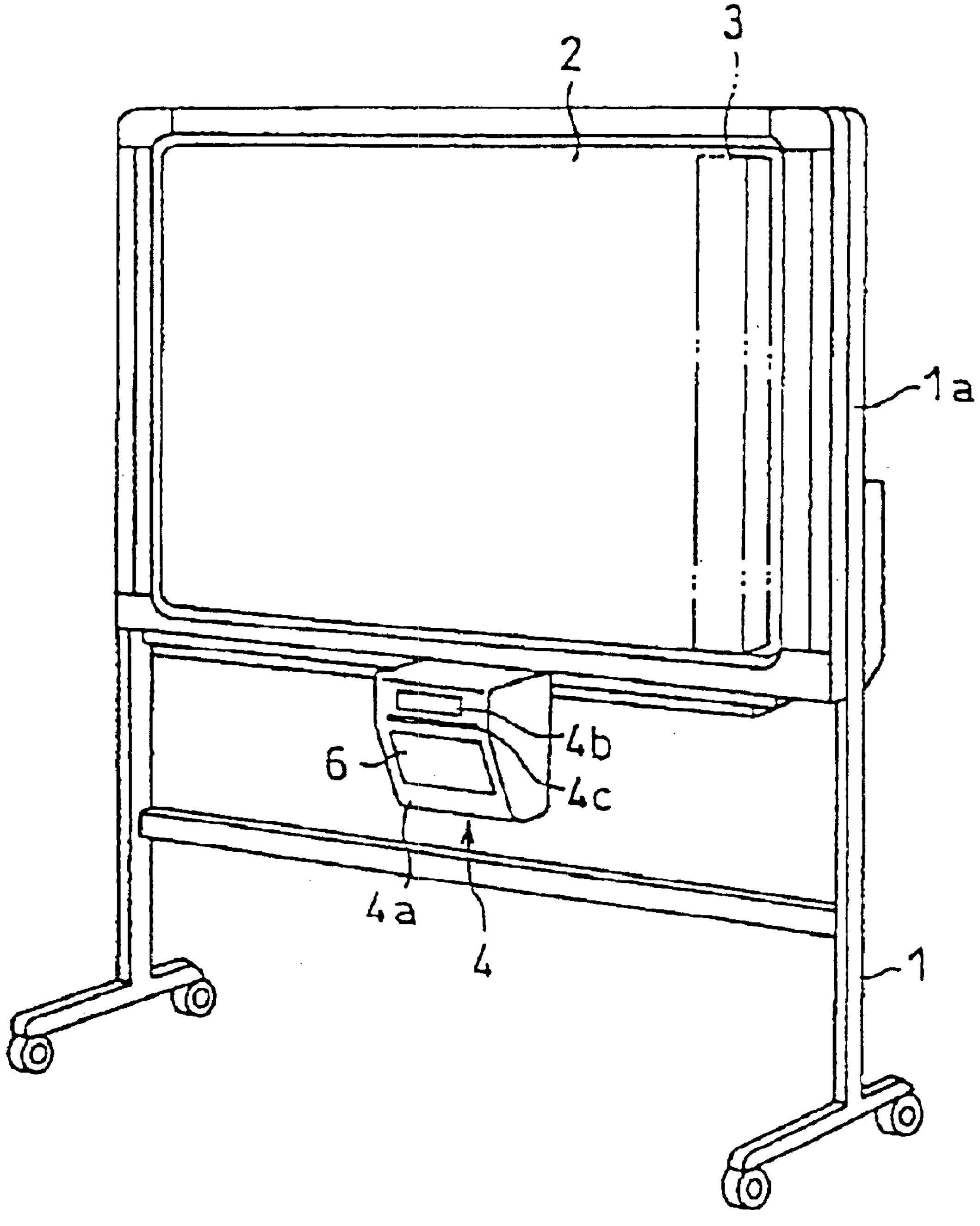
FIG. 1 is a perspective view schematically showing the outlook of an electronic print-board apparatus according to an embodiment of the invention.

1 Frame
1*a* Board
1*b* Controller (control means)
2 Screen (writing means)
2*a*, 2*b* Screen roller
2*c* Revolution driving motor
3 Optical reading device
4 Printing device
4*a* Housing
4*b* Control panel
4*c* Discharge port
5 Feeding roller
5*a* Feeding motor
6 Paper tray
6*a* Pin
6*b* Hopper
6*c* Spring
7 Discharge tray
8 Separating pad
9*a*, 9*b*, 9*c* Guide
10 Printing head
11 Platen roller
12 Ink ribbon
13 Paper detecting sensor
P-1, P-2 Recording paper, paper, printing medium

DETAILED DESCRIPTION OF THE INVENTION

An electronic print-board according to an embodiment of the invention comprises:

a screen formed in the shape of a loop, and having a writing surface;

a reading device for reading images written in the writing surface by scanning it simultaneously with revolving operation of the screen; and a printing device for feeding paper sheets, printing the images according to image information read by the reading device, and discharging the sheets.

The printing device has a transportation system for feeding the paper sheets to a printing section, and the transportation system is provided with means for adjusting feeding time of the paper sheets so that a printing operation is initiated synchronously with initiation of reading operation of the images by the reading device.

The transportation system comprises a paper tray for receiving a stack of the paper sheets and a feeding roller for picking up an uppermost sheet of the stack of sheets, and feeding it toward the printing section.

The feeding time adjustment means comprises a paper detecting sensor provided in a downstream side of the printing section for detecting a position of a leading end of the paper sheet and a control system.

The control system calculates time required for the paper sheet to reach the printing section from paper detection time detected by the paper detecting sensor, and pauses or reduces a speed of the feeding roller when it is determined that the time to initiate printing by the printing section is reached before the reading starting time of the screen.

In present invention, the printing medium means a recording paper, a recording sheet, a printing sheet a printing paper, a printing paper sheet, a paper, a plain paper, or a plain paper sheet.

An embodiment of the invention is described below by referring to the drawings.

FIG. 1 is a perspective view schematically showing the outlook of an electronic print-board apparatus according to an embodiment of the invention.

In the electronic print-board apparatus of FIG. 1, a board 1*a* is provided in a side of upper end of a free-standing frame 1. Within the board 1*a*, a screen 2 is provided as a writing medium in the shape of a loop, and the screen 2 can be revolved as it is driven by a motor (described later). Inside the board 1*a*, an optical reading device 3 is incorporated as reading means for reading an image as image information that is written on the screen 2 when the screen 2 is revolved to a backside of the board. The optical reading device 3 is similar to, for example, a device described in Japanese Patent Laid-open Publication No. 10-151893, and the image may be read as it is scanned by making use of relative movement of the screen 2 in relation to a CCD (not shown) that is provided in a fixed manner. Alternatively, the optical reading device 3 may scan the image on the screen that is stationary.

Figure 2:
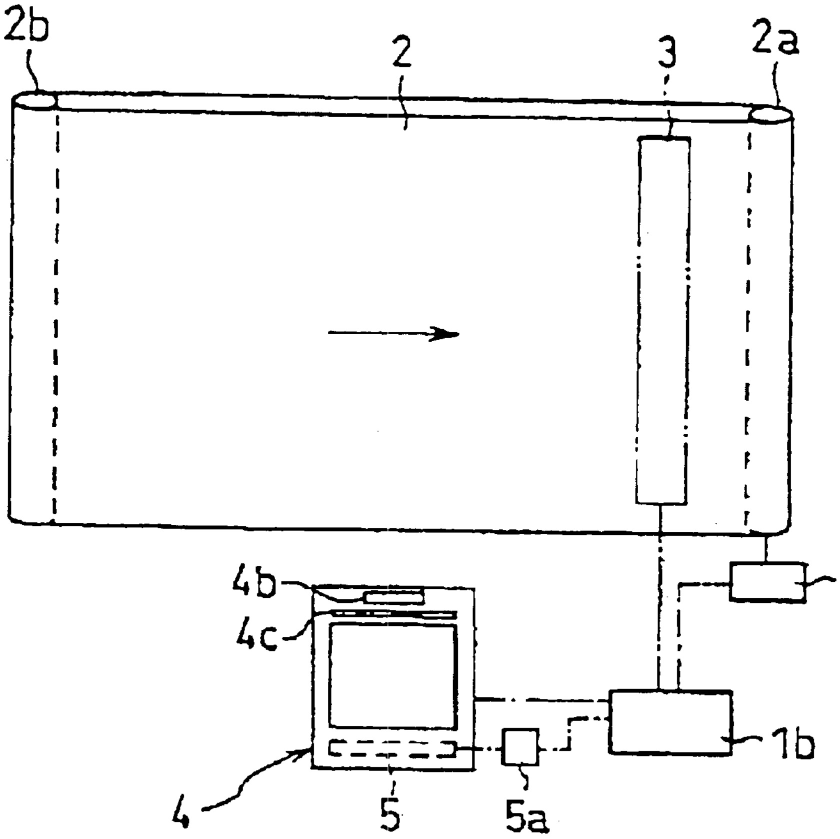
FIG. 2 is a schematic view showing a driving system for a screen and a printing device as well as a controller of an electronic printboard apparatus according to an embodiment of the invention.

A printing device 4 as printing means is located in a lower central part of the board 1*a*. The printing device 4 records the image written on the screen 2 in plain sheet paper that is reserved as a printing medium. FIG. 2 is a schematic view showing operation of the printing device 4 in relation to a revolving motion of the screen 2. In FIG. 2, screen rollers 2*a*, 2*b* are provided in either end of the loop of the screen 2, a revolution driving motor 2*c* is connected to one of the rollers 2*a*, 2*b*, and a feeding motor 5*a* for rotatably driving a feeding roller (described later) is provided in the printing device 4. Further, a controller 1*b* is provided as control means for controlling all operating components, including operations of the revolution driving motor 2*c*, feeding motor 5*a* and optical reading device 3. The revolution driving motor 2*c* is located in the board 1*a*. The feeding motor 5*a* and the controller 1*b* as control means are incorporated in the printing device 4.

Figure 3:
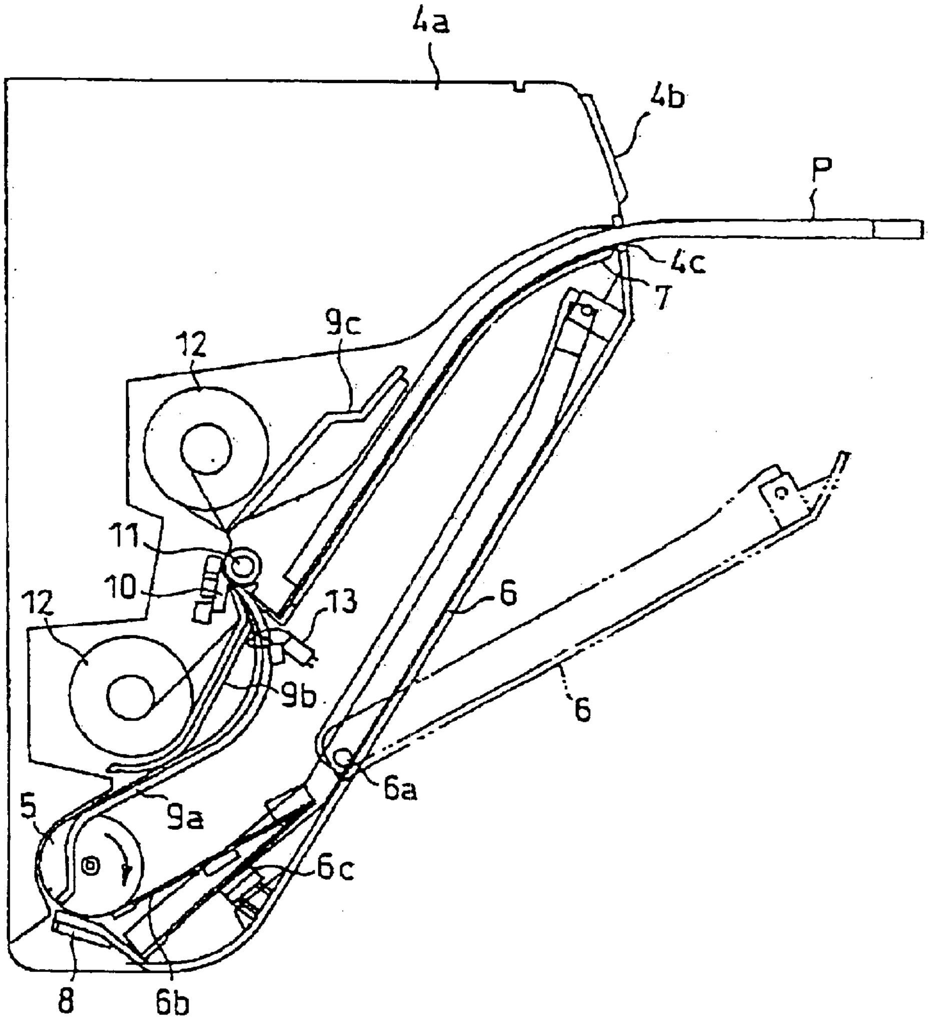
FIG. 3 is a left-side vertical section showing an internal structure of the printing device shown in FIG. 2.

A control panel 4*b* is positioned in a front surface of a housing 4*a* of the printing device 4. The printing device 4 has a transportation system for feeding the paper to a printing section. The transportation system is provided with a paper feeding time adjustment means for allowing printing operation to be initiated in synchronization with reading starting time. FIG. 3 shows a left-side section of the printing device.

In FIG. 3, a paper tray 6 forming an outer shell together with the housing 4*a* in a closed position is provided in a front side of the housing 4*a*. Inside the housing 4*a*, a discharge tray 7 for receiving and stacking paper sheets after printing is provided. The paper tray 6 is rotatably connected to the housing 4*a* by a pin 6*a*, and the paper tray 6 is opened to a position shown by a chain line when paper sheets are placed, while the.paper tray 6 is maintained in the closed position shown in a solid line when printing operation is conducted. In a side of lower end of the paper tray 6, a hopper 6*b* is swingably provided for lifting the paper in the tray by means of a spring 6*c*. The discharge tray 7 is faced to the printing section in a lower end thereof, and has a stacking surface contiguous to a discharge port 4*c* that is formed in the housing 4*a*. A paper transportation path and the printing section are located between the hopper 6*b* of the paper tray 6 and the lower end of the discharge tray 7.

In the paper transportation path, a feeding roller 5 rotatably driven by the feeding motor 5*a* (FIG. 2), a separating pad 8 for preventing plural sheets to be fed at a same time and. guides 9*a*, 9*b*, 9*c* are positioned, respectively. Then, as a device for printing to the sheets fed, a printing head 10, a platen roller 11 and an ink ribbon 12 of a cartridge type are provided. Further, a paper detecting sensor 13 for detecting a leading end of the paper is employed.

The feeding roller 5 is rotated in the direction of arrow shown in the figure, and an uppermost or lowermost paper sheet of those stacked in the paper tray 6 is moved downstream as it is nipped between the roller and the hopper 6*b*, while the separating pad serves for preventing, when plural sheets are to be fed, a lower sheet to be fed in the feeding direction. The printing head 10 is, for example, of a thermal head type. The paper sheet is nipped between the platen roller 11 and the head 10, and information is printed to the sheet by an ink from the ink ribbon 12 according to image information stored by the optical reading device 3. The paper detecting sensor 13 is, for example, of a physical contact type, and the sensor 13 outputs a detection signal to the controller 1*b* when the leading end of paper is detected.

Figure 4:
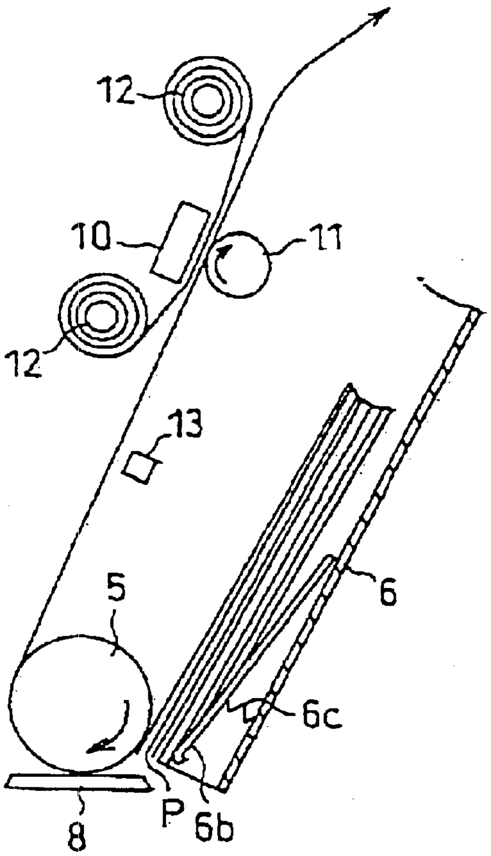
FIG. 4(*a*) is a schematic view showing a feeding operation of a sheet inside a printing device according to an embodiment of the invention, FIG. 4(*b*) is a schematic view showing a pick-up operation of an uppermost sheet, and FIG. 4(*c*) is a schematic view showing offset of a succeeding sheet in the transporting direction.
Figure 4:
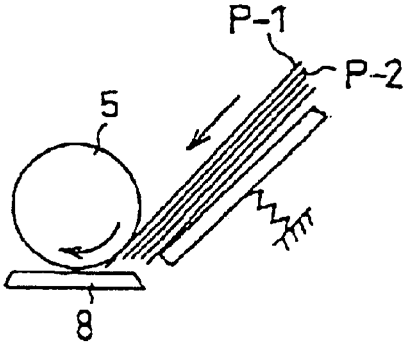
Figure 4:
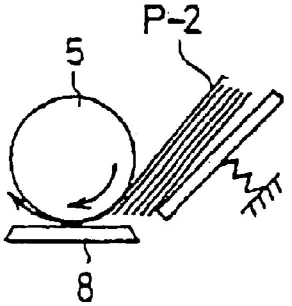

FIG. 4(*a*) is a schematic view showing the path of paper sheets P inside the printing device 4. Layers of paper sheets P stacked in the paper tray 6 are clamped between the hopper 6*b* and feeding roller 5. When the feeding roller 5 is rotated in the direction of arrow in the figure, a first sheet P-1 forming an uppermost layer is sent out by friction against a circumferential surface of the feeding roller 5, as shown in FIG. 4(*b*).

In this operation, simultaneous feeding of a second sheet P-2 that is second from the top is prevented by the separating pad 8. Then, the first sheet P-1 sent out is moved along the circumferential surface of feeding roller 5, as shown in FIG. 4(*a*), directed toward the printing head 10 by the guides 9*a*, 9*b* shown in FIG. 3, and discharged after printing onto the discharge tray 7.

In such transportation of the paper sheets P, as described above, when the first sheet P-1 is precedently sent out, the second sheet P-2 below it may be also moved in the transportation direction due to friction. Such situation is shown in FIG. 4(*c*). In FIG. 4(*c*), after the first sheet P-1 forming an uppermost layer is sent out, a leading end of the second sheet P-2 located second is advanced to a position between the feeding roller 5 and separating pad 8. As a result, when the feeding roller 5 is rotated succeedingly for feeding operation, time required for the leading end of second sheet P-2 to reach the paper detecting sensor 13 comes to be less than that for the first sheet P-1 sent out precedently to reach the paper detecting sensor 13.

It has been already described that matching time for initiating the printing operation by the printing head 10 to the paper sheets P to time for initiating the reading operation of an image on the screen 2 by the optical reading device 3 is a condition required for reducing printing time to the paper sheets P and achieving superior printing without displacement and non-printing of images. However, as shown in FIG. 4(*c*), if an initial position of the second sheet P-2 is changed as it is displaced in the transportation direction, time for the second sheet P-2 to reach the printing head 10 is also changed accordingly. Thus, in the case such paper sheets P as plain paper sheets are used as recording paper, time for the sheet to reach the printing head 10 after it is sent out of the paper tray 6 is changed variously.

On the other hand, when a printing operation is commanded through the control panel 4*b*, the revolution driving motor 2*c* is actuated. Then, an area in a front side of the screen with an image written therein is moved to a back side, and the screen 2 is moved to an initial reading position for reading of the image by the optical reading device 3. The movement of screen 2 is achieved by controlling operation of the revolution driving motor 2*c* by the controller 1*b*. Time required for the screen 2 to move to the initial reading position can be set to a fixed value.

Therefore, by using the time required for the screen 2 to move to the initial reading position as an absolute reference, and controlling time for initiating the printing operation by the printing head 10 in such manner that it matches or approximates the time for the screen to reach the initial reading position, the printing operation can be prevented from being initiated precedently, even if the time for a sheet to reach the printing head 10 tends to be reduced as the second sheet P-2 located second.

Alternatively, by using time for the paper sheets P to reach an initial printing position as an absolute reference, and controlling time for initiating the reading operation of an image on the screen 2 in such manner that it matches or approximates the time for the paper sheets P to reach the initial printing position, an effect similar to that described above can be expected.

Figure 5:
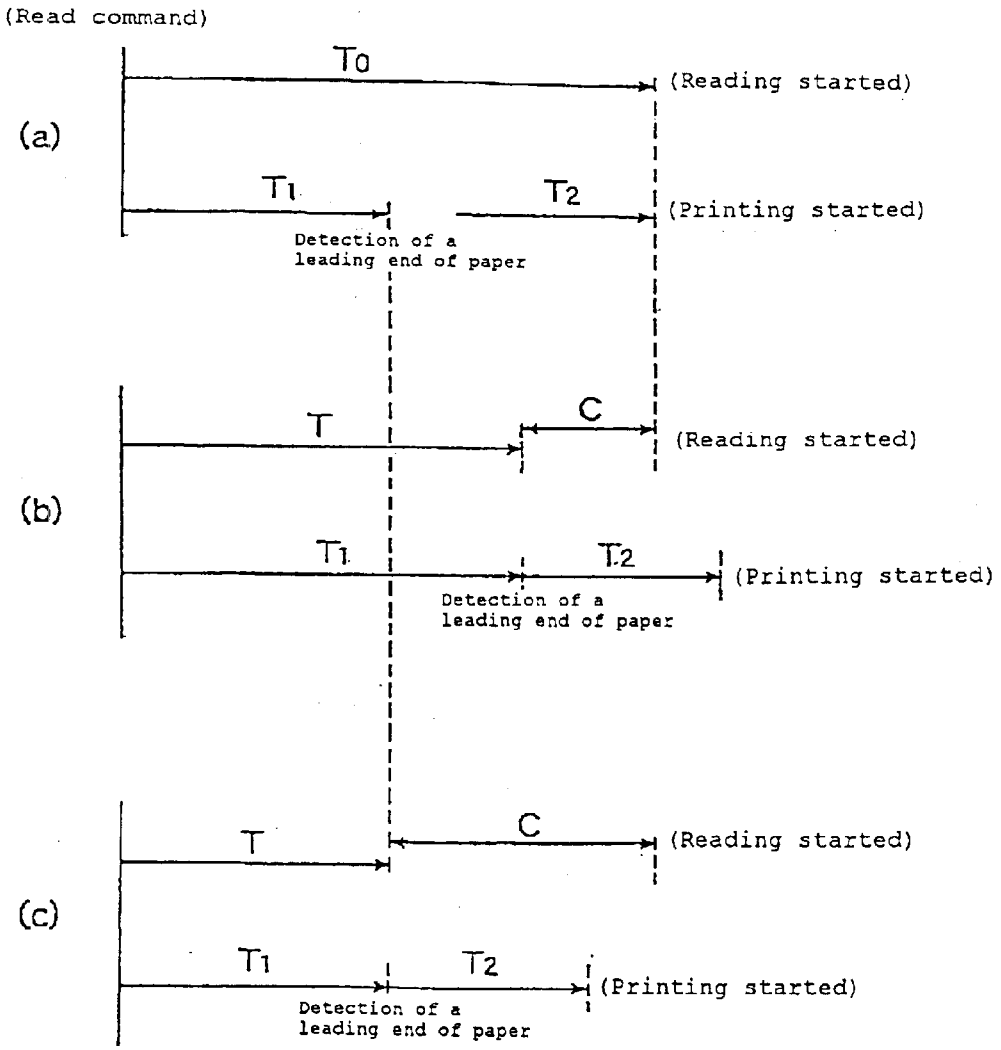
FIG. 5 is an explanatory representation showing a timing relation before initiation of printing operation onto a sheet and setting of an initial position of a screen.

FIG. 5 is a time chart for explaining above-described operation. As shown in FIG. 5(*a*), time from when a reading command is given to when the screen 2 reaches the initial reading position is shown by "T0", and time from when the reading command is given to when a leading end of paper sheet P sent out by the feeding roller 5 is detected by the paper detecting sensor 13 is shown by "T1". The time "T0" is a fixed value. The time "T1"is varied as described above. Then, time for the leading end of paper sheet P to reach the initial printing position from the position where it is detected by the paper detecting sensor 13 is shown by "T2". A distance between the detection position of the paper detecting sensor 13 and a nip position between the initial printing position (that is, printing head 10) and the platen roller 11 is fixed. When a circumferential speed of the feeding roller 5 is constant, the time T2 is a constant value.

If the print starting time is set such that it coincides with the image reading starting time, or is delayed from the image reading starting time, the.printing operation can never be initiated before the image reading operation, and an operation fulfilling such condition can be achieved by controlling time for the paper sheet P to reach the printing head 10. In other words, time to reach the initial reading position is given by (T0–T), where "T" (a variable) is a period of time the screen 2 is moved from when the printing command is given at the time the leading end of paper is detected by the paper detecting sensor. As shown in FIG. 5(*b*), the screen 2 reaches the initial reading position by the print starting time when "C≦T2", where "T0–T1=C".

When "C>T2", as shown in FIG. 5(*c*), time for the sheet P to reach the printing head 10 so that the printing operation can be initiated comes to be less than the time for the screen 2 to be set in the initial reading position. Therefore, by controllably reducing a feeding speed of the sheet, or pausing the sheet for a predetermined time, so that a relation of "C≦T2" is met, the printing operation can be initiated simultaneously when the screen 2 is set in the initial position or after that, and the printing operation is prevented from being initiated precedently as a result.

Figure 6:
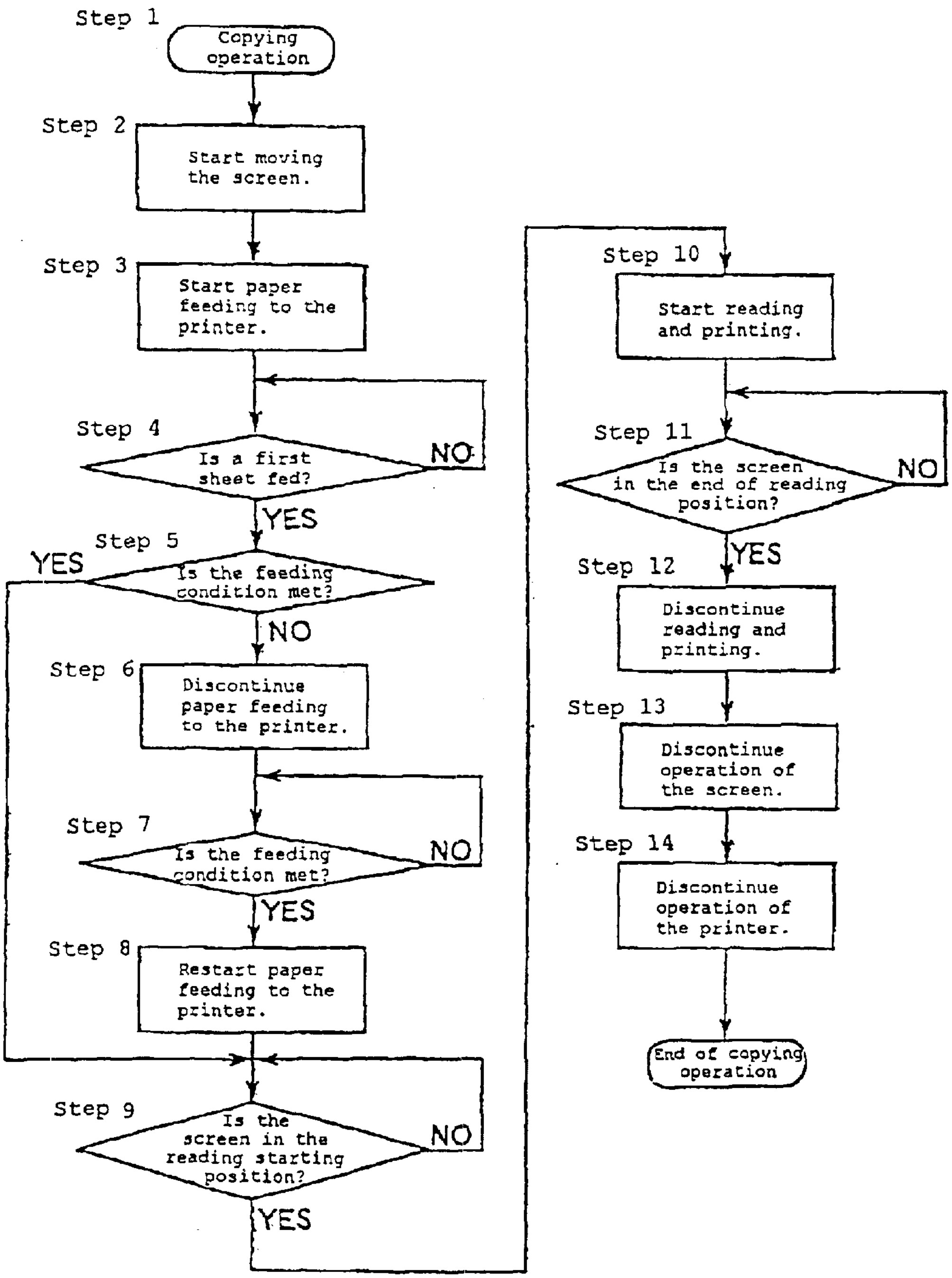
FIG. 6 is a flowchart showing a control operation according to an embodiment of the invention.

FIG. 6 is a flowchart for achieving such control. When an operator gives a printing command through the control panel 4*b*, a copying operation is initiated (step 1). The screen 2 is moved to the initial reading position for allowing an image to be read by the optical reading device 3 (step 2). In association with initiation of the movement of screen 2, the paper sheet P is fed from the paper tray 6 (step 3).

When a first sheet P located first is fed (step 4), it is determined either initiation of the reading operation of the image on the screen 2 or initiation of the printing operation to the paper sheet P would precede the other (step 5). If the printing operation might precede, operation of the feeding motor 5*a* is controllably discontinued temporarily by the controller 1*b* for pausing transportation of the sheet P (step 6). In other words, when such condition (C>T2) as shown in FIG. 5(*c*) is caused between the movement of screen 2 and supply of the paper sheet P, in step 6, it is determined to "pause paper supply to the printer", and operation of the feeding roller 5 is discontinued.

In succeeding steps, it is also determined either initiation of the reading operation and initiation of the printing operation to the paper sheet P would precede (step 7). When the condition (C≦T2) is met, paper supply to the printer is restarted.

In step 5, if the image reading operation has been initiated before initiation of the printing operation to the paper sheet P (C≦T2), operation of the feeding motor 5*a* is not discontinued, and the paper sheet P is continuously advanced toward the printing head 10 by the feeding roller 5.

When the screen 2 is set in the reading position.(step 9), the operations of reading an image on the screen 2 and printing onto the paper sheet P are initiated (step 10). As the operation of reading the image on the screen 2 is proceeded, and the screen 2 reaches an end of reading position (step 11), the reading of the image on the screen 2 and printing to the paper sheet P are completed (step 12). Then, the driving operation of screen 2 is discontinued (step 13). In succession, the operation of printing device 4 is discontinued (step 14). In such manner, the copying operation is completed.

Thus, in such condition that the feeding speed of paper sheet P is faster in comparison with the time for the screen 2 to reach the initial reading position, the timing is adjusted by pausing operation of the feeding motor 5*a*, and the paper sheet P is advanced to the printing section between the printing head 10 and platen roller 11, so as to match approximately with the image reading start time of the screen 2.

Therefore, when paper sheets P are employed, even if the time for the paper sheet to reach the printing head 10 is varied, the variation of time is absorbed, and synchronization between the reading starting time for an image on the screen 2 and the print starting time can be achieved. As a result, the time from commanding to completing the printing operation can be reduced. In addition, an image can be printed without displacement in relation to the paper sheet P and non-printed parts.

Such construction can be also provided that the timing is adjusted in above-described condition (C≦T2) by, alternatively to pausing the feeding motor 5*a*, rotating an output shaft of the motor at a lower speed for reducing a circumferential speed of the feeding roller 5. In such construction as well, the controller 1*b* can control a rotational speed of the output shaft of the feeding motor 5*a* according to the relation between the times "T0", "T1", "T2" and "C" described above in such manner that the printing operation to the paper sheet. P is initiated coincidentally with arrival of the screen 2 at the initial reading position.

According to the invention, even if time required for paper sheets to be fed to the printing head, the time for initiating the printing operation can be synchronized with the time for initiating the reading operation of an image on the screen. Therefore, similarly to the case such paper wound in the form of a roll as thermal paper is continuously fed, even when paper sheets are employed, an image can be printed without displacement and non-printed parts, and a print of superior quality can be obtained. Also, time required for the printing operation can be minimized. As a result, a print can be obtained by using such paper as plain paper for the recording purpose. In comparison with the case of using thermal paper that is not sturdy, and tends to be curled, convenience in filing and clerical handling can be, therefore, improved.

What is claimed is:

1. An electronic pnint-board apparatus comprising:

a writing medium having a writing surface where image information is written on said writing surface, reading means for reading said image information, printing means for printing said image information read by said reading means onto a printing medium, and control means for adjustably controlling driving of said reading means and driving of said printing means so that initiation of driving of said reading means being synchronous with initiation of printing of said printing means, wherein said printing means includes a transportation system for transporting said printing medium as a plurality of paper sheets to a printing section, and said transportation system includes time adjustment means for said plurality of paper sheets for allowing a printing to be initiated n synchronization with initiation of reading of said image information by said reading means, wherein said transportation system includes a paper tray for containing a stack of said plurality of paper sheets, and a feeding roller for picking up and sending out a paper sheet that forms an uppermost layer of said stack of said plurality of paper sheets, and said transportation time adjustment means includes a paper detecting sensor provided downstream of said printing section for detecting a position of a leading end of said paper sheet and a control system, in which said control system calculates time required for the paper sheet to reach said printing section from paper detection time detected by said paper detecting sensor, and pauses and reduces a speed of said feeding roller when time for initiating printing operation of said printing section is to be reached before the time for initiating reading of image information on said writing medium.

2. An electronic print-board apparatus of claim 1, wherein said control means controls driving of said reading means by temporarily discontinuing the driving for synchronization with driving of said printing means.

3. An electronic print-board apparatus of claim 1, wherein said control means controls driving of said reading means by reducing a driving speed thereof for synchronization with driving of said printing means.

4. An electronic print-board apparatus of claim 1, wherein said printing means includes a plurality of plain paper sheets.

5. An electronic print-board apparatus comprising:

reading means for reading an image information from a predetermined position, said image information being written in a writing medium having a writing surface;

printing means for printing the image information read by said reading means onto a printing medium;

control means for adjustably controlling driving of said printing means and driving of said reading means so that initiation of driving of said printing means being synchronous with initiation of reading of reading means, wherein said printing means includes a transportation system for transporting said printing medium as a plurality of paper sheets to a printing section, said transportation system includes transportation time adjustment means for said plurality of paper sheets for allowing printing to be initiated in synchronization with initiation of image information by said reading means, wherein said transportation system includes a paper tray for containing a stack of said plurality of paper sheets, and a feeding roller for picking up and sending out a paper sheet that forms an uppermost laver of said stack of said plurality of paper sheets, and said transportation time adjustment means includes a paper detecting sensor provided downstream of said printing section for detecting a position of a leading end of said paper sheet and a control system, in which said control system calculates time required for the paper sheet to reach said printing section from paper detection time detected by said paper detecting sensor, and pauses and reduces a speed of said feeding roller when time for initiating printing operation of said printing section is to be reached before the time for initiating reading of image information on said writing medium.

6. An electronic print-board apparatus of claim 5, wherein said control means controls driving of said printing means by temporarily discontinuing the driving for synchronization with driving of said reading means.

7. An electronic print-board apparatus of claim 5, wherein said control means controls driving of said printing means by reducing a driving speed thereof for synchronization with driving of said reading means.

8. An electronic print-board apparatus of claim 5, wherein said printing means includes a plurality of plain paper sheets.

9. An electronic print-board apparatus comprising:

reading means for reading an image information from a predetermined position, said image information being written in a writing medium having a writing surface;

printing means for printing the image information read by said reading means onto a printing medium;

control means for adjustably controlling print starting time of said printing means for synchronization with reading starting time of said reading means, wherein said printing means includes a transportation system for transporting said printing medium as a plurality of paper sheets to a printing section, said transportation system includes transportation time adjustment means for said plurality of paper sheets for allowing printing to be initiated in synchronization with initiation of reading of said image information by said reading means, wherein said transportation system includes a paper tray for containing a stack of said plurality of paper sheets, and a feeding roller for picking up and sending out a paper sheet that forms an uppermost layer of said stack of the plurality of paper sheets, and said transportation time adjustment means includes a paper detecting sensor provided downstream of said printing section for detecting a position of a leading end of said paper sheet and a control system. in which said control system calculates time required for the paper sheet to reach said printing section from paper detection time detected by said paper detecting sensor, and pauses and reduces a speed of said feeding roller when time for initiating printing operation of said printing section is to be reached before the time for initiating reading of image information on said writina medium.

10. An electronic print-board apparatus of claim 9, wherein said control means controls the print starting time of said printing means in such manner that it is coincidental with the reading starting time of said reading means.

11. An electronic print-board apparatus comprising:

reading means for reading an image information from a predetermined position, said image information being written in a writing medium having a writing surface;

printing means for printing the image information read by said reading means onto a printing medium;

control means for adjustably controlling reading starting time of said reading means for synchronization with print starting time of said printing means, wherein said printing means includes a transportation system for transporting said printing medium as a plurality of paper sheets to a printing section, said transportation system includes transportation time adjustment means for said plurality of paper sheets for allowing printing to be initiated in synchronization with initiation of reading of said image information by said reading means, wherein said transportation system includes a paper tray for containing a stack of said plurality of paper sheets, and a feeding roller for picking up and sending out a paper sheet that forms an uppermost layer of said stack of the plurality of paper sheets, and said transportation time adjustment means includes a paper detecting sensor provided downstream of said printing section for detecting a position of a leading end of said paper sheet and a control system, in which said control system calculates time required for the paper sheet to reach said printing section from paper detection time detected by said paper detecting sensor, and pauses and reduces a speed of said feeding roller when time for initiating printing of said printing section is to be reached before the time for initiating reading of image information on said writing medium.

12. An electronic print-board apparatus of claim 11, wherein said control means controls the reading starting time of said reading means in such manner that it is coincidental with the print starting time of said printing means.

13. An electronic print-board apparatus comprising:

a screen having a writing surface formed in the shape of a loop;

a reading device for reading an image written in said writing surface by scanning it simultaneously when said screen is revolved; and a printing device for supplying each paper sheet of a plurality of paper sheets, printing said image on said each paper sheet according to the image information read by said reading device, and discharging said each paper sheet which is printed thereon, wherein said printing device includes a transportation system for transporting said paper sheet to a printing section, and said transportation system includes transportation time adjustment means for said paper sheet for allowing a printing operation to be initiated in synchronization with initiation of reading operation of said image by said reading device.

14. An electronic print-board apparatus of claim 13, wherein said transportation system includes a paper tray for containing a stack of said plurality of paper sheets, and a feeding roller for picking up and sending out a paper sheet that forms an uppermost layer of said stack of the plurality of paper sheets, and said transportation time adjustment means includes a paper detecting sensor provided downstream of said printing section for detecting a position of a leading end of said paper sheet and a control system, in which said control system calculates time required for the paper sheet to reach said printing section from paper detection time detected by said paper detecting sensor, and pauses and reduces a speed of said feeding roller when time for initiating printing operation of said printing section is to be reached before the time for Initiating reading operation of an image on said screen.

15. A printing method for printing written information that is written on a writing surface of an electronic blackboard to a plurality of printing sheets comprising the steps of:

(a) placing said plurality of printing sheets in a paper tray;

(b) moving at least one of reading means and said writing surface to an initial position for allowing said reading means to be faced against said writing surface;

(c) transporting a first printing sheet of said plurality of printing sheets from inside said paper tray to printing means;

(d) reading said written information by said reading means, and printing said written information onto said first printing sheet by said printing means according to the information from said reading means;

(e) transporting a second printing sheet of said plurality of printing sheets from inside said paper tray to said printing means after printing to said first printing sheet is completed, (f) reading said written information by said reading means, and printing said written information onto said second printing sheet by said printing means according to the information from said reading means, and (g) controlling at least one selected from the group consisting of said reading means, said printing means and a feeding means in such manner that reading starting time for said reading means to start reading next written Information and print starting time for said printing means to start printing to said second printing sheet are coincidental with each other.

16. A printing method of claim 15, wherein said reading means is operated in synchronization with driving of said printing means.

17. A printing method of claim 15, wherein said reading means is operated in synchronization with driving of said printing means as the driving of reading means is temporarily discontinued.

18. A printing means of claim 15, wherein said reading means is operated in synchronization with driving of said printing means as an operating speed of said reading means is reduced.

19. A printing method of claim 15, wherein said printing means is operated in synchronization with driving of said reading means.

20. A printing method of claim 15, wherein said printing means is operated in synchronization with driving of said reading means as the driving of printing means is temporarily discontinued.

21. A printing method according to claim 15, wherein said printing means is operated in synchronization with driving of said reading means as an operating speed of said printing means is reduced.

22. A printing method of claim 15, wherein said feeding means transports said second printing sheet in such manner that reading starting time for said reading means to start reading next written information and print starting time for said printing means to start printing to said second printing sheet are coincidental with each other.

23. A printing method of claim 15, wherein said writing surface has a screen formed in the shape of a loop, and said screen may be revolved.

24. A printing method of claim 15, wherein said step (e) includes a step of comparing reading starting time for said reading means to start reading said written information with print starting time for said printing means to start printing to said second plain paper sheet, and driving of at least one selected from the group consisting of said reading means, said printing means and said feeding means is controlled according to said step of comparing.

25. A printing method of claim 15, wherein said plurality of printing sheets are a plurality of plain papers.

26. A printing method of claim 15, wherein said plurality of printing sheets are stacked in said paper tray.

27. An electronic print-board apparatus according to claim 1, where said image information is handwritten on said writing surface.

28. An electronic print-board apparatus according to claim 5 where said image information is handwritten in said writing medium.

29. An electronic print-board apparatus according to claim 9, wherein said image information is handwritten in said writing medium.

30. An electronic print-board apparatus according to claim 11, wherein said image information is handwritten in said writing medium.

* * * * *